INVENTORS
Lee A. Kilgore and
Charles G. Hagensick.
BY
F. E. Browder
ATTORNEY

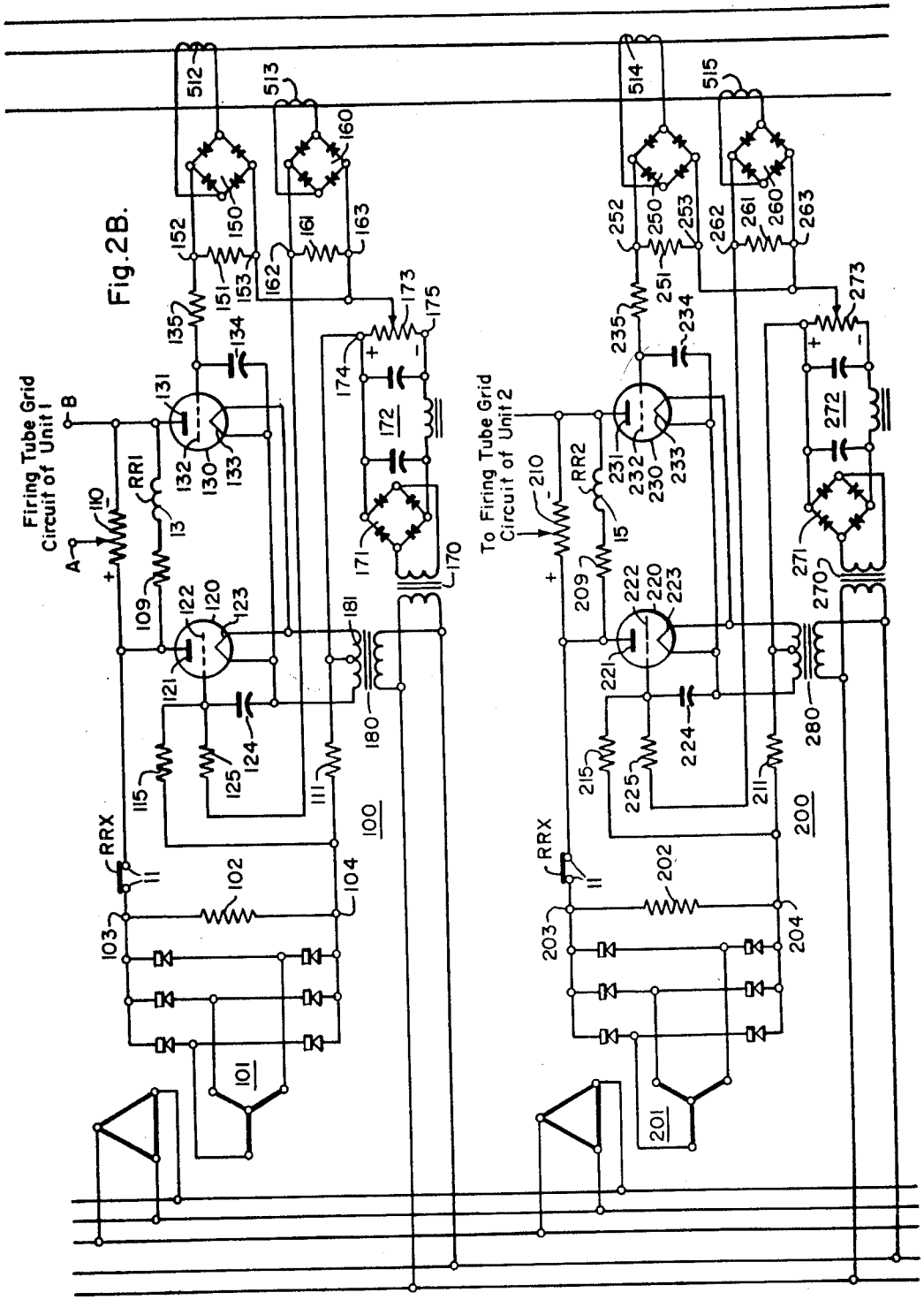

United States Patent Office 2,989,682
Patented June 20, 1961

2,989,682
CONTROL CIRCUITRY

Charles G. Hagensick, Penn Township, Allegheny County, and Lee A. Kilgore, Export, Pa., assignors to Westinghouse Electric Corporation, East Pittsburgh, Pa., a corporation of Pennsylvania
Filed Mar. 31, 1958, Ser. No. 725,343
8 Claims. (Cl. 321—14)

This invention relates to control circuitry in general, and in particular to current-shift, control circuitry that may be utilized with inverter power supply equipment or apparatus for interchanging electric energy between two different electric systems at least one of said systems being an alternating current system.

It is an object of this invention to provide improved current-shift control circuitry for electronic converter power supply equipment.

It is another object of this invention to provide current-shift control circuitry which will enable equipment to ride through an inverter fault without causing tripping of the normal short circuiting protection apparatus and thereby avoiding a consequent partial shutdown and loss of operating time.

Further objects of this invention will become apparent from the following description when taken in conjunction with the accompanying drawings. In said drawings, for illustrative purposes only, is shown a preferred form of the invention.

For the purposes of showing an embodiment of the invention, the current-shift control circuitry scheme is shown as applied to an inverter connected to a highly inductive load and having the power circuit arranged to have two or more parallel branches. Each branch may consist of one or more separate inverter units in series. Each inverter unit comprises at least one tube having a main anode-cathode circuit and a control circuit. In event of an inverter fault on a single unit one one parallel branch, the counter voltage of that branch is reduced and the load current transfers to that branch, thus putting more than normal current in the faulted tube. If the fault persists for more than a predetermined number of cycles, for example 3 to 5 cycles depending upon the inverter fault detection relay setting, a partial shutdown occurs to cause operation of other protective devices which cause deenergization of the alternating-current circuit to the inverters.

In the present invention, when an inverter fault occurs, the unfaulted branch is released to rectify after the current has shifted to the faulted branch. All of the load current then transfers to the unfaulted branch and thus terminates or reduces the current in the faulted branch. This rectifying operation is applied for a predetermined number of cycles, for example 1 or 2 cycles, and if the faulted tube does not recover, the conventional partial shutdown equipment will provide backup protection. Thus, the purpose of this invention is to provide a means of riding through most inverter faults so that the number of partial shutdowns can be reduced.

Figure 1:
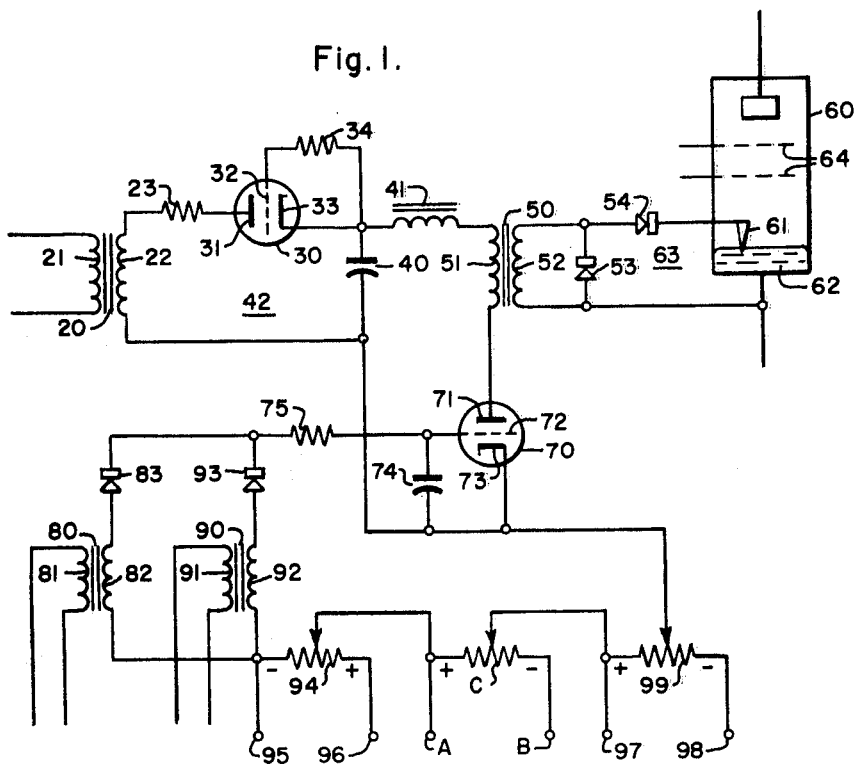
FIGURE 1 is a schematic diagram of an ignitor excitation circuit embodying a portion of the teachings of this invention.

Referring to FIG. 1, there is illustrated a schematic diagram of an ignitor excitation circuit of one ignitron to illustrate the relationships of the bias supply in the thyratron firing tube grid circuit. An ignitron 60 has its igniter 61-cathode 62 circuit controlled by a thyratron 70. The firing of the thyratron 70 is controlled by the combination of the negative bias connected to the terminals 95 and 96, the positive bias for normal rectifier operation which is connected to the terminals 97 and 98, and the new positive bias from the control circuit or the current shift circuit which is illustrated in FIG. 2, which is to be connected to the terminals A and B.

The secondary winding 22 of a charging transformer 20 is connected in series circuit relationship with a capacitive means 40, a charging resistor 23, and a rectifier means 30 thereby making up an energy storing circuit 42. Power is supplied to a primary winding 21 of the transformer 20 and the capacitor is charged through the resistor 23, and the rectifying means 30. Although the rectifying means 30 is shown as a thyratron having an anode 31 connected to the resistor 23 and a cathode 33 connected to the capacitor 40, the grid 32 being connected through a resistor 34 to the cathode 33, a dry type rectifier may be utilized if so desired.

The capacitor 40 is connected in a series discharge circuit with an inductance 41, a primary winding 51 of an ignitor coupling transformer 50, and a thyratron 70. An anode 71 of the thyratron 70 is connected to the primary winding 51 of the transformer 50. A cathode 73 of the thyratron 70 is connected to the capacitor 40. A grid 72 of the thyratron 70 is connected to the cathode 73 through a capacitive means 74. The capacitor 74 is utilized to provide shunt capacitance between the grid 72 and the cathode 73 so as to make grid-cathode capacitance large compared with the anode-grid capacitance. Thus, application of anode voltage will not cause the grid to be released. Capacitors are so connected hereinafter between grids and cathodes to accomplish the same results. A secondary winding 82 of a rectifier peaking transformer 80 and a rectifier 83 are connected in series circuit relationship with a resistor 75 between the terminal 95 and the grid 72 of the thyratron 70. A secondary winding 92 of an inverter peaking transformer 90 and a rectifier 93 are connected in series with the resistor 75 between the terminal 95 and the grid 72 of the thyratron 70. Low peak voltages are applied to a primary winding 81 of the rectifier peaking transformer 80. High peak voltages are applied to a primary winding 91 of the inverter peaking transformer 90. An adjustable, tapped resistor or rheostat 94 is connected between the terminals 95 and 96. An adjustable, tapped resistor or rheostat C is connected between the terminals A and B. An adjustable, tapped resistor or rheostat 99 is connected between the terminals 97 and 98. The tap on the resistor 94 is connected to the terminal A. The tap on the resistor C is connected to the terminal 97. The tap on the resistor 99 is connected to the cathode 73 of the thyratron 70.

The firing capacitor 40 is charged through the charging transformer 20 and the rectifying means 30. The firing capacitor 40 is used to send a current pulse through the sloping inductance 41, the primary winding 51 of the ignitor coupling transformer 50, and through the firing thyratron 70 for both rectifier and inverter operation. The voltage induced on the secondary winding 52 of the transformer 50 is used to fire the ignitor 61 of the ignitron 60 through the rectifier 54. The firing of the ignitor 61 is the basic control of the ignitron 60. One or more grids 64 may be utilized to aid in pickup or deionization of the ignitron 60. The connection of one end of the secondary winding 52 to the cathode 62 of the ignitron completes the control circuit 63 of the ignitron 60 for the firing pulse. A commutating rectifier 53 is connected across the secondary winding 52 to aid the dissipation of the voltage when the field across the winding 52 starts to collapse.

The thyratron 70 is released at the proper time by the application of low and high voltage peaks to the transformers 80 and 90. The voltage peaks applied to the transformers 80 and 90 are of different phases. A positive bias voltage with polarity as shown is applied to the terminals 97 and 98 for a normal rectifier operation. A negative bias voltage with polarity as shown is applied to the terminals 95 and 96. The circuit illustrated in FIG. 1 receives a positive bias with polarity as shown from the current shift circuit illustrated in FIGS. 2a, 2b and 2c at the terminals A and B. The bias applied to the terminals A and B causes the thyratron 70 to release the ignitron 60 to rectify instead of its previous inverter operation.

Figure 2A:
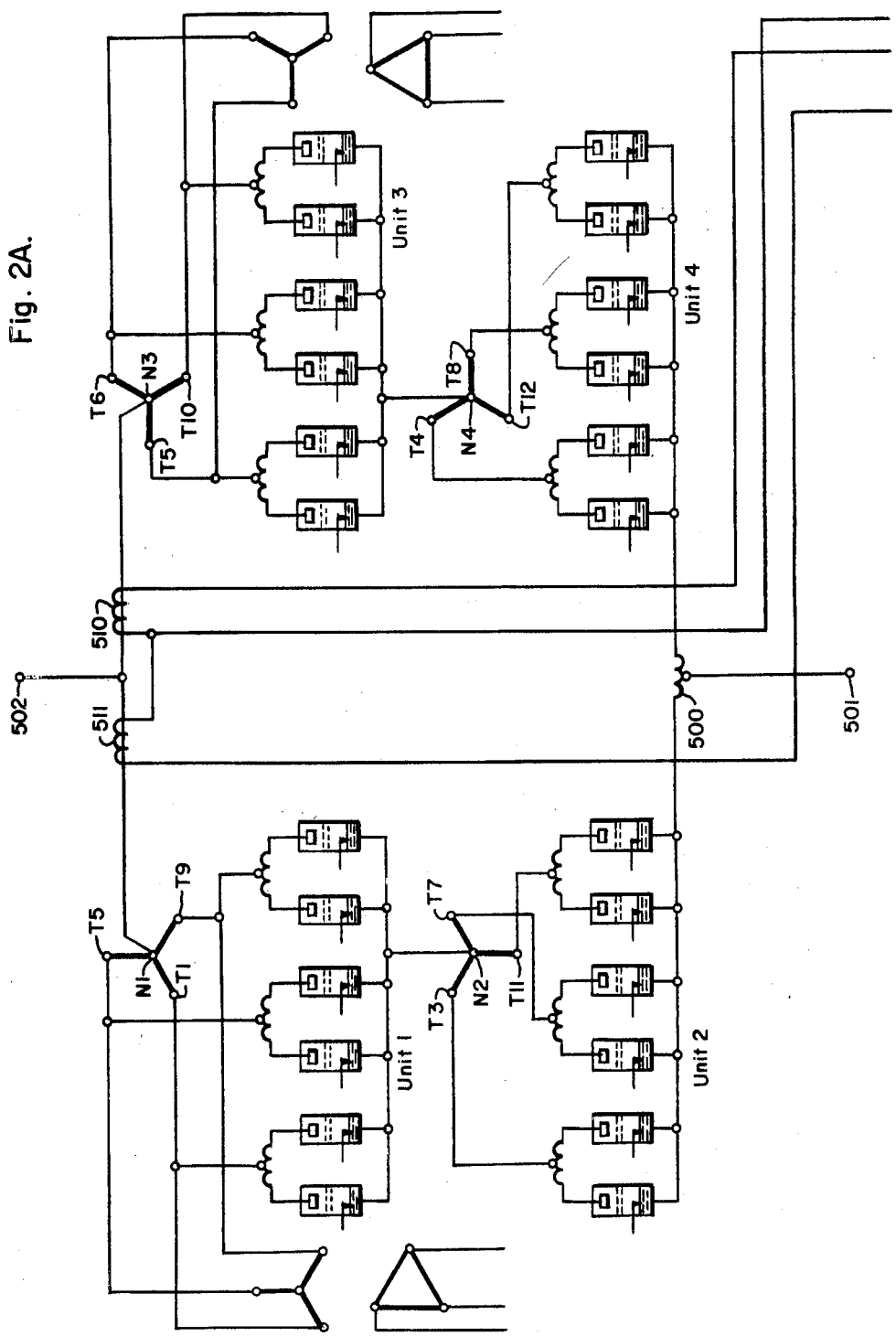
FIG. 2 is a schematic diagram illustrating the current-shift control circuitry and associated equipment for four electronic power converter units connected to one generator unit and is divided into 2A, 2B and 2C on three sheets of drawings.
Figure 2C:
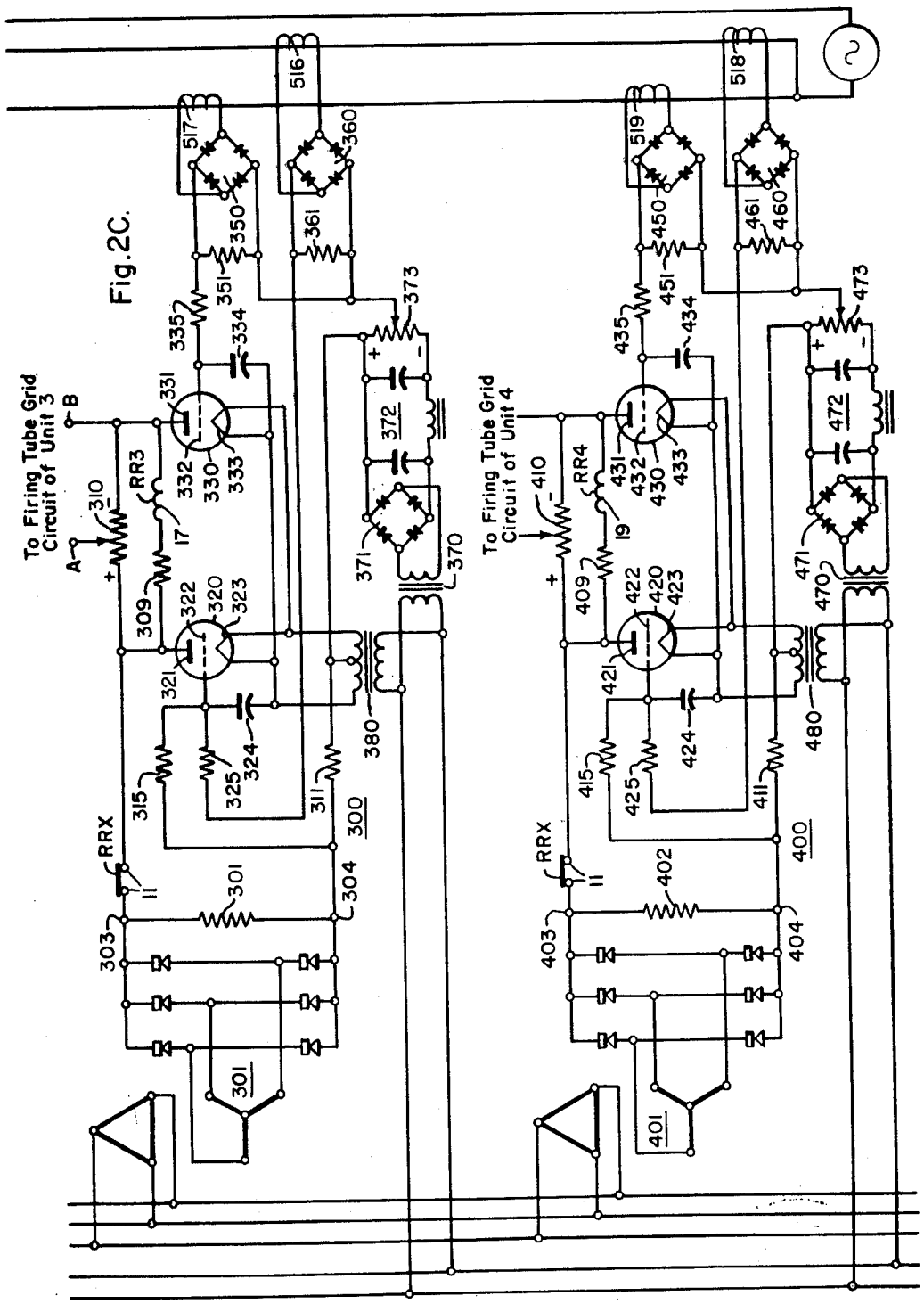

Referring to FIGS. 2a, 2b and 2c there is illustrated a schematic diagram of current-shifting control circuits embodying the teachings of this invention as applied to four ignitron units connected to one generator or other alternating-current supply equipment. In general, the current-shifting control circuits 100, 200, FIG. 2b, 300 and 400, FIG. 2c, comprises pairs of thyratrons 120, 130, 220 and 230, 320, 330, 420 and 430 utilized as electronic switching means and controlling ignitron units 1, 2, 3 and 4, respectively of FIG. 2a. Four thyratron anode power supplies are designated generally at 101, 201, 301 and 401. Eight auxiliary current transformers 512, 513, 514, 515, 516, 517, 518 and 519 are arranged to obtain voltage signals proportional to the alternating-currents in the transductor windings 510 and 511. The thyratrons 130, 230, 330 and 430 act as electronic switching means to switch the output of their respective anode power supplies to the excitation circuits. The thyratrons 120, 220, 320 and 420 function as electronic switching means to short-circuit the output of their respective current-shift control circuits.

The anode power supply 101 of the current-shift control circuit 100 impresses a voltage across the resistor 102, which is connected between the terminals 103 and 104. A reset relay RRX having a coil 10 and contacts 11 is connected between the terminal 103 and an anode 121 of the thyratron 120. The coil 10 of the reset relay RRX is also connected between the terminal 103 through a resistor 110 to an anode 131 of the thyratron 130. The field winding of a relay RR1 having contacts 12 and a coil 13 is connected through a current limiting resistor 109 which aids in shaping the output across the resistor 110. Alternately, the relay RR1 may be connected in series with the resistor 110 or across the resistor 111. Adjustment of the value of the resistor 109 will also help determine the pickup time of the relay RR1. A resistance 115 is connected between the terminal 104 and a grid 122 of the thyratron 120. A resistance 111 is connected between the terminal 104 and a terminal 174.

The current transformer 512 is connected across the input of the full wave rectifier 150. The current transformer 513 is connected across the input of the full wave rectifier 160. The resistor 151 and the resistor 161 are connected across the respective outputs of the full wave rectifiers 150 and 160. The terminal 152 of the resistor 151 is connected through a resistor 135 to a grid 132 of the thyratron 130. The terminal 153 of the resistor 151 is connected to the tap of the rheostat 173. The terminal 162 of the resistance 161 is connected through a resistance 125 to the grid 122 of the thyratron 120. The terminal 163 of the resistance 161 is connected to the tap of the rheostat 173.

The primary winding of the transformers 170 and 180 are connected to a supply of alternating-current voltage. The secondary winding of the transformer 170 is connected across the input of the full wave rectifier 171. The output of the full wave rectifier 171 is connected across the rheostat 173 at the terminals 174 and 175 through a smoothing filter 172, which may be an L or T type although shown as a "pi" type. The cathode-heaters 123 and 133 of the thyratrons 120 and 130 are connected in parallel across the center tap secondary winding 181 of the transformer 180. The center tap of the transformer 181 is connected to the terminal 174. A capacitor 124 is connected between the grid 122 and the cathode 123 of the thyratron 120. A capacitor 134 is connected between the grid 132 and the cathode 133 of the thyratron 130.

The anode power supply 201 of the current-shift control circuit 200 impresses a voltage across the resistor 202, which is connected between the terminals 203 and 204. A reset relay RRX having a coil 10 and contacts 11 is connected between the terminal 203 and an anode 221 of the thyratron 220. The reset relay RRX is also connected between the terminal 203 through a resistor 210 to an anode 231 of the thyratron 230. The field winding of a relay RR2 having contacts 14 and a coil 15 is connected through a current limiting resistor 209 across the resistor 210. A resistance 215 is connected between the terminal 204 and a grid 222 of the thyratron 220. A resistance 211 is connected between the terminal 204 and a terminal 274.

The current transformer 514 is connected across the input of the full wave rectifier 250. The current transformer 515 is connected across the input of the full wave rectifier 260. The resistor 251 and the resistor 261 are connected across the respective outputs of the full wave rectifiers 250 and 260. The terminal 252 of the resistor 251 is connected through a resistor 235 to a grid 232 of the thyratron 230. The terminal 253 of the resistor 251 is connected to the tap of the rheostat 273. The terminal 262 of the resistance 261 is connected through a resistance 225 to the grid 222 of the thyratron 220. The terminal 263 of the resistance 261 is connected to the tap of the rheostat 273.

The primary winding of the transformers 270 and 280 are connected to a supply of alternating-current voltage. The secondary winding of the transformer 260 is connected across the input of the full wave rectifier 271. The output of the full wave rectifier 271 is connected across the rheostat 273 at the terminals 274 and 275 through a smoothing filter 272. The cathode 223 and 233 of the thyratrons 220 and 230 are connected in parallel across the center tap secondary winding 281 of the transformer 280. The center tap of the transformer 281 is connected to the terminal 274. A capacitor 224 is connected between the grid 222 and the cathode 223 of the thyratron 220. A capacitor 234 is connected between the grid 232 and the cathode 233 of the thyratron 230.

The anode power supply 301 of the current-shift control circuit 300 impresses a voltage across the resistor 302, which is connected between the terminals 303 and 304. A reset relay RRX having a coil 10 and contacts 11 is connected between the terminal 303 and an anode 321 of the thyratron 320. The reset relay RRX is also connected between the terminal 303 through a resistor 310 to an anode 331 of the thyratron 330. The field winding of a relay RR3 having contacts 15 and a coil 17 is connected through a current limiting resistor 309 across the resistor 310. A resistance 315 is connected between the terminal 304 and a grid 322 of the thyratron 320. A resistance 311 is connected between the terminal 304 and a terminal 374.

The current transformer 516 is connected across the input of the full wave rectifier 350. The current transformer 517 is connected across the input of the full wave rectifier 360. The resistor 351 and the resistor 361 are connected across the respective outputs of the full wave rectifiers 350 and 360. The terminal 352 of the resistor 351 is connected through a resistor 335 to a grid 332 of the thyratron 330. The terminal 353 of the resistor 351 is connected to the tap of the rheostat 373. The terminal 362 of the resistance 361 is connected through a resistance 325 to the grid 322 of the thyratron 320. The terminal 363 of the resistance 361 is connected to the tap of the rheostat 373.

The primary winding of the transformers 370 and 380 are connected to a supply of alternating-current voltage. The secondary winding of the transformer 360 is connected across the input of the full wave rectifier 371. The output of the full wave rectifier 371 is connected across the rheostat 373 at the terminals 374 and 375 through a smoothing filter 372. The cathode 323 and 333 of the thyratrons 320 and 330 are connected in parallel across the center tap secondary winding 381 of the transformer 380. The center tap of the transformer 381 is connected to the terminal 374. A capacitor 324 is connected between the grid 322 and the cathode 323 of the thyratron 320. A capacitor 334 is connected between the grid 332 and the cathode 333 of the thyratron 330.

The anode power supply 401 of the current-shift control circuit 400 impresses a voltage across the resistor 402, which is connected between the terminals 403 and 404. A reset relay RRX having a coil 10 and contacts 11 is connected between the terminal 403 and an anode 421 of the thyratron 420. The reset relay RRX is also connected between the terminal 403 through a resistor 410 to an anode 431 of the thyratron 430. The field winding of a relay RR4 having contacts 18 and a coil 19 is connected through a current limiting resistor 409 across the resistor 410. A resistance 415 is connected between the terminal 404 and a grid 422 of the thyratron 420. A resistance 411 is connected between the terminal 404 and a terminal 474.

The current transformer 518 is connected across the input of the full wave rectifier 450. The current transformer 519 is connected across the input of the full wave rectifier 460. The resistor 451 and the resistor 461 are connected across the respective outputs of the full wave rectifiers 450 and 460. The terminal 452 of the resistor 451 is connected through a resistor 435 to a grid 432 of the thyratron 430. The terminal 453 of the resistor 451 is connected to the tap of the rheostat 473. The terminal 462 of the resistance 461 is connected through a resistance 425 to the grid 422 of the thyratron 420. The terminal 463 of the resistance 461 is connected to the tap of the rheostat 473.

The primary winding of the transformers 470 and 480 are connected to a supply of alternating-current voltage. The secondary winding of the transformer 460 is connected across the input of the full wave rectifier 471. The output of the full wave rectifier 71 is connected across the rheostat 473 at the terminals 474 and 475 through a smoothing filter 472. The cathode 423 and 433 of the thyratrons 420 and 430 are connected in parallel across the center tap secondary winding 481 of the transformer 480. The center tap of the transformer 481 is connected to the terminal 474. A capacitor 424 is connected between the grid 422 and the cathode 423 of the thyratron 420. A capacitor 434 is connected between the grid 432 and the cathode 433 of the thyratron 430.

The ignitron units 1, 2 and the units 3, 4, FIG. 2a, are connected in parallel branches between the output terminals 501 and 502. The output terminal 501 is the center tap of the interphase transformer 500 which connects the two parallel branches. The transductor windings 510 and 511 are inductively disposed to sense the amount of current flow in the two parallel branches, the transductor winding 511 sensing the current flow in the parallel branch containing the units 1 and 2, and the transductor winding 510 sensing the current flow in the units 3 and 4.

The thyratrons or electronic switching means 130, 230, 330 and 430 will, when released or biased closed, cause the voltage of the power supplies 101, 201, 301 and 401 to appear across the resistors 110, 210, 310 and 410 and the resistors 111, 211, 311 and 411, respectively. A positive voltage across the resistors 110, 210, 310 and 410 will cause a release of their corresponding firing tubes in each individual ignitor excitation circuit, as illustrated in FIG. 1, by applying these respective voltages to the terminals A and B of the respective excitation circuits. Since the resistors 110, 210, 310 and 410 are in the respective firing tube grid circuits, they will not affect the normal operation of their respective ignitor excitation circuits, as illustrated in FIG. 1, since they present a low series resistance compared with that of the firing tube grid circuits.

The thyratrons or electronic switching means 120, 220, 320 and 420 will, when released or biased closed, cause the voltage from the hereinbefore mentioned respective power supplies to appear only across the resistors 111, 211, 311 and 411. The resistors 111, 211, 311 and 411 are also for the purpose of obtaining a negative blocking bias on the grids of the thyratrons 120, 220, 320 and 420, or biasing said electronic switching means open, when a corresponding thyratron 130, 230, 330 and 430, respectively, is released or biased closed first. The grids of the thyratrons are normally negatively biased to some suitable predetermined value which is adjustable by means of the rheostats 173, 273, 373, and 473. These thyratrons can normally be released only when a branch current in one of the ignitron units 1, 2 or 3, 4 is above normal, such as a shift of the current during an inverter fault. In such event, the overcurrent in the transductor alternating-current circuit is rectified by the associated full wave rectifiers and puts a positive voltage across either the resistors 151, 251, 351 and 451 or the resistors 161, 261, 361 and 461, which will in turn cause the corresponding thyratron grid to be released or the corresponding electronic switching means to be biased closed.

The transductor circuits shown are merely exemplary of one method of sensing the load current of many known to those skilled in the art. The signal obtained from the transductor circuits may be utilized in methods other than the one shown, such as using the difference signal between the two load branches to cause release of their respective thyratrons.

In order to more clearly present the operation of the apparatus illustrated in FIGS. 2a, 2b and 2c, the following steps give the sequence of operation in the event of an assumed inverter fault or arc-through on the ignitron unit 1. The transfer of almost all of the current to the faulted branch occurs so that all the output current is now being carried in units 1 and 2. This will occur after the start of the arc-through, at which time the interphase transformer 500 has become saturated.

An overcurrent in the transductor winding 511 alternating circuit results in an increase in the bias voltage across the resistors 161 and 261 of the current-shift control circuits 100 and 200 and will also result in an increase in bias voltage across the resistors 251 and 451 of the current-shift control circuits 300 and 400.

The thyratrons 120, 220, 330 and 430 are released by the over voltages across their respective bias resistors 161, 261, 351 and 451.

The thyratrons 330 and 430 now cause a positive bias to be impressed on the terminals AB of their respective ignitor excitation circuits to the units 3 and 4. These thyratrons 330 and 430 also cause current to flow in the resistors 311 and 411 of the current-shift control circuits 300 and 400, respectively, thus putting on a blocking bias to prevent later conduction of the thyratrons 320 and 420, respectively, after the load current shifts to the units 3 and 4.

The release of the thyratrons 120 and 220 cause the output to the terminals AB of their respective ignitor excitation circuits to the units 1 and 2 to be short circuited or shunted, so that the thyratrons 130 and 230 cannot later pick up and put a positive bias to the terminals AB on these respective ignitor excitation circuits of the units 1 and 2.

Because the new positive bias has been applied to the terminals AB of their ignitor excitation circuits, the ignitron units 3 and 4 will rectify and pick up the load current, thereby relieving the faulted branch. The resulting over-current in the inductor winding 510 alternating circuit will cause no changes in the current-shift control circuits 100, 200, 300 and 400 because of the blocking bias action described in the preceding two paragraphs.

The voltages across the resistors 310 and 410 will cause the relays RR3 and RR4 to pick up within a desired adjustable time.

Figure 3:
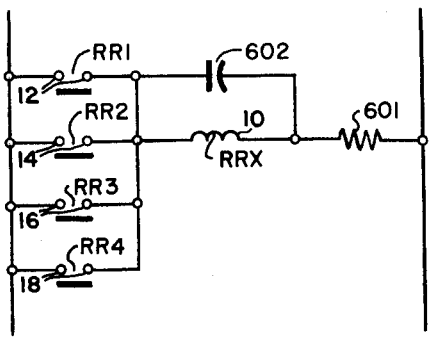
FIG. 3 is a schematic diagram illustrating the operation of the switching apparatus which is included in FIG. 2.

Referring to FIG. 3, the contacts of the relay RR1, RR2, RR3 and RR4 are shown connected in parallel. These paralleled contacts are then connected serially through the field coil 10 of the reset relay RRX. A power source is connected across the paralleled contacts of the relay RR1, RR2, RR3 and RR4 and the serially connected field of the relay RRX. When the relays RR3 and RR4 close, as in the above-described sequence of operations, the normally closed reset relay RRX will open after a predetermined time. Said predetermined time being determined by the current in the field as adjustable by current limiting means 601 and the capacitor 602. The opening of the normally closed relay RRX opens the anode power circuit to the current-shift control circuits 100, 200, 300 and 400. The opening of the anode power circuits 101, 201, 301 and 401 removes the positive bias from the terminals AB of the ignitor excitation circuits for the ignitron units 3 and 4 and will also reset the four current-shift control circuits 100, 200, 300 and 400, by removing voltage from the thyratron anode circuits. Other similar methods for resetting the current-shift control circuits 100, 200, 300 and 400 may be used.

The ignitron units 1, 2, 3 and 4 will now be released at inverter angles as being the normal operation. Current will shift again into the units 1 and 2, and if the fault remains cleared, the operation will return to normal with each branch conducting its share of the current.

An apparatus has been provided to provide a means of riding through inverter faults. The apparatus causes rectifier operating in the unfaulted branch of the ignitron units during an inverter fault so as to cause current to shift out of the branch containing the faulted tube. This rectifier operation is continued for a predetermined number of cycles during which time the faulted tube will be relieved of its current. If the fault has been cleared at the end of the above-mentioned predetermined number of cycles, then normal inverter operation can be restored without the conventional inverter fault detection apparatus causing a partial shutdown. In providing a means of riding through inverter faults, the number of shutdowns and thus loss of operating time will be reduced.

In conclusion, it is pointed out that while the illustrated example constitutes a practical embodiment of our invention, we do not limit ourselves to the exact details of circuitry and components shown, since modification of the same may be varied without departing from the spirit of this invention.

We claim as our invention:

1. A conversion apparatus for interchanging electric energy between two different electric systems; at least one of said systems being an alternating current system; the power circuit of said apparatus having at least two parallel branches; each said branch comprising at least one inverter unit having at least one tube with a main anode-cathode circuit and a control circuit; excitation means for said control circuit of each said tube; said excitation means providing firing signals to said tube in response to a plurality of phased input signals; sensing means for determining the amount of current flow in each said parallel branch; a current-shift control circuit for each said inverter unit connected to each said excitation circuit of each said tube of each said inverter unit; reset circuit means for each said current-shift control circuit; and circuit means connecting the output of said sensing means to each said current-shift control circuit; said sensing means in response to an overcurrent in a first parallel branch being operative to cause a current-shift control circuit of a second parallel branch without overcurrent to produce an output to said excitation means of said tubes of said second parallel branch whereby said second parallel branch is permitted to rectify for a predetermined time while the overcurrent condition is being cleared in said first parallel branch.

2. A conversion apparatus for interchanging electric energy between two different electric systems; at least one of said systems being an alternating current system; the power circuit of said apparatus having at least two parallel branches; each said branch comprising at least one inverter unit having at least one tube with a main anode-cathode circuit and a control circuit; excitation means for said control circuit of each said tube; said excitation means providing firing signal to said tube in response to a plurality of phased input signals; sensing means for determining the amount of current flow in each said parallel branch; a current-shift control circuit for each said inverter unit connected to each said excitation circuit of each said tube of each said inverter unit; reset circuit means for each said current-shift control circuit; and circuit means connecting the output of said sensing means to each said current-shift control circuit; said sensing means in response to an overcurrent in a first parallel branch being operative to cause a current-shift control circuit of a second parallel branch without overcurrent to produce an output to said excitation means of said tubes of said second parallel branch whereby said second parallel branch is permitted to rectify for a predetermined time while the overcurrent condition is being cleared in said first parallel branch; said output of said current-shift control circuit of said second parallel branch being connected to said reset circuit means; said reset circuit means in response to an output from said current-shift control circuit being adapted to disconnect power supply means from said current-shift control circuit after said predetermined time.

3. A conversion apparatus for interchanging electric energy between two different electric systems; at least one of said systems being an alternating current system; the power circuit of said apparatus having at least two parallel branches; each said branch comprising at least one inverter unit having at least one tube with a main anode-cathode circuit and a control circuit; excitation means for said control circuit of each said tube; said excitation means providing firing signal to said tube in response to a plurality of phased input signals; sensing means for determing the amount of current flow in each said parallel branch; a current-shift control circuit for each said inverter unit connected to each said excitation circuit of each said tube of each said inverter unit; reset circuit means for each said current-shift control circuit; and circuit means connecting the output of said sensing means to each said current-shift control circuit; said current-shift control circuit cimprising power supply means and first and second electronic switching means connected to switch the output of said power supply means, the output of said first electronic switching means being the output of said current-shift control circuit, said second electronic switching means being connected to shunt said power supply; the output of said sensing means being connected to control said first and second electronic switching means; said output of said current-shift control circuit of said second parallel branch being connected to said reset circuit means; said reset circuit means in response to an output from said current-shift control circuit being adapted to disconnect power supply means from said current-shift control circuit after said predetermined time.

4. A conversion apparatus for interchanging electric energy between two different electric systems; at least one of said systems being an alternatiing current system; the power circuit of said apparatus having first and second parallel branches; each said branch comprising at least one inverter unit having at least one tube with a main anode-cathode circuit and a control circuit; excitation means for said control circuit of each said tube; first and second transductor means for sensing the amount of current flowing in said first and second parallel branches, respectively; first and second current-shift control circuit means for said first and second parallel branches, respectively; said first and second current-shift control circuit means connected to each said excitation means of each said tube of each said inverter unit of said first and second parallel branches, respectively; reset circuit means for each said current-shift control circuit means; and circuit means connecting the output of said first and second transductor means to each said current-shift control circuit means; the output of said first transductor means in response to an overcurrent in said first parallel branch being operative to cause said second current-shift control circuit means to produce an output to said respective excitation means; said respective excitation means in response to an output from said second current-shift control means being operative to permit said tubes of said second parallel branch to rectify for a predetermined time while the overurrent condition is being cleared in said first parallel branch.

5. A conversion apparatus for interchanging electric energy between two different electric systems; at least one of said systems being an alternating current system; the power circuit of said apparatus having first and second parallel branches; each said branch comprising at least one inverter unit having at least one tube with a main anode-cathode circuit and a control circuit; excitation means for said control circuit of each said tube; first and second transductor means for sensing the amount of current flowing in said first and second parallel branches, respectively; first and second current-shift control circuit means for said first and second parallel branches, respectively; said first and second current-shift control circuit means connected to each said excitation means of each said tube of each said inverter unit of said first and second parallel branches, respectively; reset circuit means for each said current-shift control circuit means; and circuit means connecting the output of said first and second transductor means to each said current-shift control circuit means; the output of said first transductor means in response to an overcurrent in said first parallel branch being operative to cause said second current-shift control circuit means to produce an output to said respective excitation means; said respective excitation means in response to an output from said second current-shift control means being operative to permit said tubes of said second parallel branch to rectify for a predetermined time while the overcurrent condition is being cleared in said first parallel branch; said output of said first transductor means being operative to cause the output of said first current-shift control means to be short-circuited.

6. A conversion apparatus for interchanging electric energy between two different electric systems; at least one of said systems being an alternating current system; the power circuit of said apparatus having first and second parallel branches; each said branch comprising at least one inverter unit having at least one tube with an anode-cathode circuit and a control circuit; excitation means for said control circuit of each said tube; first and second transductor means for sensing the amount of current flowing in said first and second parallel branches, respectively; first and second current-shift control circuit means for said first and second parallel branches, respectively; each said current-shift control means comprising power supply means and first and second electronic switching means connected to switch the output of said power supply means, the output of said first electronic switching means being the output of said current-shift control circuit means, said second electronic switching means being connected to short-circuit the output of said first electronic switching means; the output of said first and second current-shift control circuit means being connected to said excitation means of said associated inverter units of said first and second parallel branches, respectively; the output of said first transductor means being connected to bias said first and second electronic switching means of said second current-shift control circuit means open and closed, respectively, in response to an overcurrent in said first parallel branch.

7. A conversion apparatus for interchanging electric energy between two different electric systems; at least one of said systems being an alternating current system; the power circuit of said apparatus having first and second parallel branches; each said branch comprising at least one inverter unit having at least one tube with an anode-cathode circuit and a control circuit; excitation means for said control circuit of each said tube; first and second transductor means for sensing the amount of current flowing in said first and second parallel branches, respectively; first and second current-shift control circuit means for said first and second parallel branches, respectively; each said current-shift control means comprising power supply means and first and second electronic switching means connected to switch the output of said power supply means, the output of said first current shift control circuit means being the output of said current shift control circuit means, said second electronic switching means being connected to short-circuit the output of said first electronic switching means; the output of said first and second current-shift control circuit means being connected to said excitation means of said associated inverter units of said first and second parallel branches, respectively; the output of said first transductor means being connected to bias said first and second electronic switching means of said second current-shift control circuit means open and closed, respectively, in response to an overcurrent in said first parallel branch; the output of said first transductor means being connected to bias said first and second electronic switching means of said first current-shift control circuit means closed and open, respectively, in response to an overcurrent in said first parallel branch.

8. A conversion apparatus for interchanging electric energy between two different electric systems; at least one of said systems being an alternating current system; the power circuit of said apparatus having first and second parallel branches; each said branch comprising at least one inverter unit having at least one tube with an anode-cathode circuit and a control circuit; excitation means for said control circuit of each said tube; first and second transductor means for sensing the amount of current flowing in said first and second parallel branches, respectively; first and second current-shift control circuit means for said first and second parallel branches, respectively; each said current-shift control means comprising power supply means and first and second electronic switching means connected to switch the output of said power supply means, the output of said first electronic switching means being the output of said current shift control circuit means, said second electronic switching means being connected to short-circuit the output of said first electronic switching means; the output of said first and second current-shift control circuit means being connected to said excitation means of said associated inverter units of said first and second parallel branches, respectively; the output of said first transductor means being connected to bias said first and second electronic switching means of said second current-shift control circuit means open and closed, respectively, in response to an overcurrent in said first parallel branch; the output of said first transductor means being connected to bias said first and second electronic switching means of said first current-shift control circuit means closed and open, respectively, in response to an overcurrent in said first parallel branch; said excitation means of said inverter unit of said second parallel branch being operative to release said inverter unit to rectify in response to an output from said second current-shift control circuit.

References Cited in the file of this patent

UNITED STATES PATENTS

| | | |
|---|---|---|
| 2,179,308 | Taliaferro | Nov. 7, 1939 |
| 2,243,571 | Moyer et al. | May 27, 1941 |
| 2,243,572 | Moyer | May 27, 1941 |